US009928849B2

(12) United States Patent
Wolff

(10) Patent No.: US 9,928,849 B2
(45) Date of Patent: Mar. 27, 2018

(54) METHOD AND DEVICE FOR SLOWING A DIGITAL AUDIO SIGNAL

(75) Inventor: Christophe Wolff, Illkirch (FR)

(73) Assignee: WSOU Investments, LLC, Los Angeles, CA (US)

( * ) Notice: Subject to any disclaimer, the term of this patent is extended or adjusted under 35 U.S.C. 154(b) by 315 days.

(21) Appl. No.: 14/238,602

(22) PCT Filed: Aug. 8, 2012

(86) PCT No.: PCT/EP2012/065495
§ 371 (c)(1),
(2), (4) Date: Apr. 23, 2014

(87) PCT Pub. No.: WO2013/029944
PCT Pub. Date: Mar. 7, 2013

(65) Prior Publication Data
US 2014/0229167 A1    Aug. 14, 2014

(30) Foreign Application Priority Data
Aug. 31, 2011   (FR) ...................................... 11 57705

(51) Int. Cl.
*G10L 21/045*   (2013.01)
*G10L 25/00*    (2013.01)
*G10L 15/26*    (2006.01)

(52) U.S. Cl.
CPC ............ *G10L 21/045* (2013.01); *G10L 15/26* (2013.01); *G10L 15/265* (2013.01); *G10L 25/00* (2013.01)

(58) Field of Classification Search
CPC .................................................. G10L 21/045
See application file for complete search history.

(56) References Cited

U.S. PATENT DOCUMENTS

| 2002/0087311 A1* | 7/2002 | Leung Lee ............ G06Q 30/06 704/251 |
| 2006/0190261 A1* | 8/2006 | Wang .................... G10L 15/197 704/260 |

(Continued)

FOREIGN PATENT DOCUMENTS

| CN | 1906660 | 1/2007 |
| CN | 101939784 | 1/2011 |

(Continued)

OTHER PUBLICATIONS

Lawlor, B. et al; A Novel High Quality Efficient Algorithm for Time-Scale Modification of Speech; 6th European Conference on Speech Communication and Technology; Eurospeech '99, Budapest, Hungary, Sep. 5-9, 1999; European Conference on Speech Communication and Technology; (Eurospeech); BONN: ESCA, DE; Jan. 1, 1999; pp. 2785-2788; XP008001615.

(Continued)

*Primary Examiner* — Marivelisse Santiago Cordero
*Assistant Examiner* — Lennin Rodrigues Gonzalez
(74) *Attorney, Agent, or Firm* — Sean D. Burdick

(57) ABSTRACT

A method for slowing a digital audio signal from the transmitter in order to transmit a slowed-down digital audio signal to a receiver, comprises the conversion of the digital audio signal received from a transmitter into a text made up of a series of words, assigning a timestamp bookmark to each word of the text, identifying words that belong to patterns referenced in a database of patterns to be eliminated, the definition of a rate of slowing, the adaptation of timestamped bookmarks to a slowed-down time frame based on the time of slowing, the slowing of the digital audio signal, the deletion of patterns to be eliminated, and the transmission to the receiver of a slowed-down digital audio signal.

11 Claims, 2 Drawing Sheets

(56) References Cited

U.S. PATENT DOCUMENTS

Figure 1:
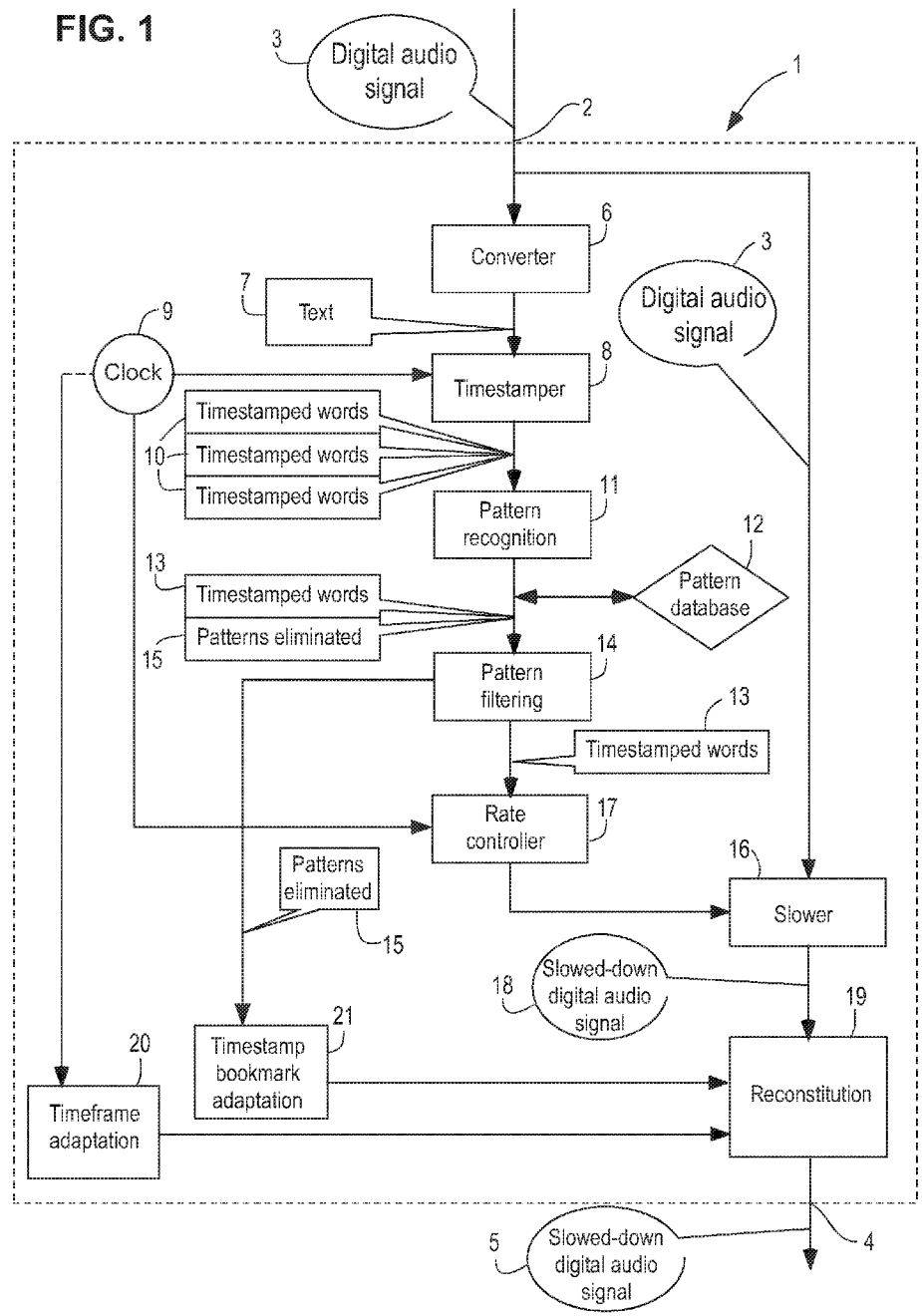

| | | | |
|---|---|---|---|
| 2008/0190271 A1* | 8/2008 | Taub et al. | 84/645 |
| 2010/0161761 A1* | 6/2010 | Yu | G06F 15/16 709/219 |
| 2011/0040562 A1* | 2/2011 | Doyle | G11B 27/322 704/251 |
| 2011/0195758 A1* | 8/2011 | Damale | H04M 1/6075 455/569.1 |
| 2013/0033994 A1* | 2/2013 | Parekh | H04L 43/026 370/252 |

FOREIGN PATENT DOCUMENTS

| | | |
|---|---|---|
| EP | 1840877 | 10/2007 |
| EP | 2169669 | 3/2010 |
| JP | H097294 | 1/1997 |
| JP | 2004212665 | 7/2004 |
| JP | 2005148307 | 6/2005 |
| JP | 2008040431 | 2/2008 |

OTHER PUBLICATIONS

Arons, Barry; Speech Skimmer: A System for Interactively Skimming Recorded Speech; Mar. 1997 Issue of ACM Transactions on Computer-Human Interaction; vol. 4, No. 1; 30 pages; 1997 ACM.

\* cited by examiner

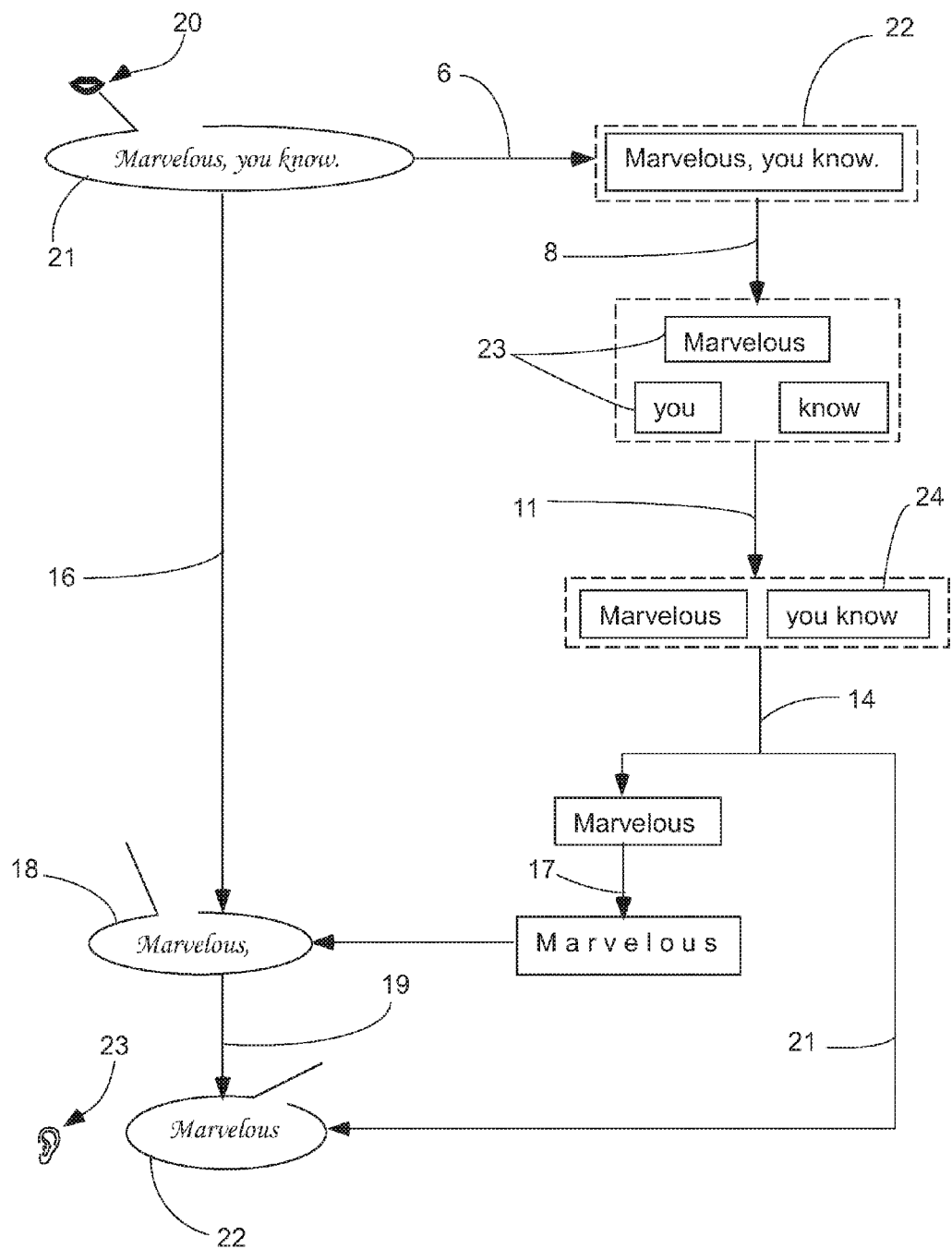

METHOD AND DEVICE FOR SLOWING A DIGITAL AUDIO SIGNAL

CROSS-REFERENCE

This application is based on French Patent Application No. 11 57 705 filed Aug. 31, 2011, the disclosure of which is hereby incorporated by reference thereto in its entirety, and the priority of which is hereby claimed under 35 U.S.C. § 119.

BACKGROUND

The present invention pertains to a method intended to slow a digital audio signal to enable effective real-time spoken communication between people who are speaking a language that at least one of those people is not completely fluent in.

One of the most frustrating experiences is being unable to understand a speaker whose language is different. It is common to encounter difficulties understanding a language that is foreign to us. However, an essential part of human interaction is to listen, understand, and communicate with others. The world is becoming globalized, and opportunities to communicate with people who speak different languages are increasing. Linguistic diversity among a company's employees, to take an example, poses a variety of challenges.

Languages differ in the phonemes they employ, which naturally creates difficulties when faced with a foreign language. Spoken language omits many elements and relies on the situation in which a conversation takes place. There are many grammatical errors due to the simultaneity of thinking and speaking. Most frequently, a background noise becomes mixed with spoken words. This is particularly illustrated by the difficulty that voice recognition computer systems have at recognizing human language. All of these obstacles require thinking effort by the person who is listening, which hinders his or her instant understanding and may cause him or her to lose the thread of the conversation.

For example, people who need to communicate around the world today do so mainly with the English language. Unfortunately, their skills with that language are not the same, and it is often very difficult to understand English spoken quickly by a native speaker. The problem is therefore to slow down talking speed without any chance of losing the meaning of the discussion and while remaining in transparent interactive communication.

Solutions for slowing down speech have existed for several years. However, they have an intrinsic secondary effect of causing the conversation to take longer. This disrupts communication, which becomes tedious, with the risk of breaking down. These solutions are applied without drawbacks for broadcast events (TV, web, etc.), but are not acceptable for interactive communication. If this slowdown were only applied for the person who is less at ease with the language being used, the more fluent speaker would have to wait for the end of the slow transmission of his or her question to obtain a response. This makes interactivity in the exchange problematic.

SUMMARY

It is therefore a purpose of the present invention to enable improved interactive communication between two speakers, who do not have the same level of fluency in the language being used, without either of the speakers being disrupted in his or her verbal exchanges.

It is also a purpose of the invention to enable a listener to assign more time to understanding the speaker's speech without the pace of the verbal exchange being affected by this.

It is also a purpose of the invention to propose a method that makes it possible to slow down the rate of a speaker's words in a manner that is only perceptible to whoever is listening to him or her.

The object of the present invention is a method for slowing down a digital audio signal from the transmitter in order to transmit a slowed-down digital audio signal to a receiver, comprising the following steps
  the digital audio signal received from the transmitter is converted into a text made up of a series of words,
  a timestamp bookmark is assigned to each word in the text relative to an absolute time reference,
  words belonging to patterns referenced in a database are identified, and patterns to be eliminated are deduced from this,
  a rate of slowing is defined based on the patterns to be eliminated,
  the timestamp bookmarks are adapted to a slowed-down time frame based on the rate of slowing,
  the digital audio signal received from the transmitter is slowed down,
  the patterns to be eliminated are deleted from the digital audio signal received from the transmitter.
  a slowed-down digital audio signal is transmitted to the receiver.

When a discussion or speech is analyzed, incidents are noted in the course of verbalized thought, such as:
  pauses,
  hesitations concealed by onomatopoeia,
  meaningless "dummy words" often related to language tics,
  repetitions.

All of these events contribute to communication because they form part of the ambience and personality of the person who is speaking. However, they do not contribute to giving meaning to the words that are exchanged. Thus, instead of settling for an approximate or even incorrect understanding, the purpose of the invention is to get rid of these events, in order to free up time so as to allocate enough of it to slowing down the sentence without losing its actual meaning, and thereby to retain real-time interactivity.

According to a first aspect, the pattern database receives new patterns from the pattern recognition block. In particular, it may be repetitions or language tics specific to the speaker.

According to a second aspect, the pattern database receives a list of required words whose presence is allowed in the patterns that make up the conversation. In particular, proper nouns, such as the names of companies or people, or first names or nicknames, may frequently enter into conversation. In such a case, they might be identified as language tics. Naturally, it is absolutely essential to avoid deleting them, as the statement would become incomprehensible.

According to a third aspect, a level of priority is assigned to each pattern. This makes it possible to select patterns that will be eliminated based on their priority, so as to be able to adapt the rate of slowing to the transmitter's speech rate.

Initially, the timestamp bookmarks are assigned to each word of the text with reference to the absolute time given by the reference clock, then they are converted into a slowed-down timeframe, which is the new reference established based on the rate of slowing that had been defined.

It is also an object of the invention to have a device for implementing that method. In particular, the object of the invention is a device for implementing the method described above, comprising
- an input that receives a digital audio signal from a transmitter,
- a converter that converts the digital audio signal into a text made up of a series of words,
- a timestamper that associates timestamp bookmarks with each of the text's words,
- a pattern database that contains the referenced patterns,
- a pattern recognition block that identifies the words contained in the referenced patterns and deduces from them the patterns to eliminate,
- a pattern filtering block that filters the patterns to be eliminated,
- a flow controller that defines the rate of slowing,
- a digital audio signal slower that slows the digital audio signal based on the rate of slowing,
- a timeframe adaptation block that defines a slowed-down timeframe based on the rate of slowing,
- a timestamp bookmark adaptation block that adjusts the timestamp bookmarks within the slowed-down timeframe,
- a reference clock that provides an absolute reference time to the pattern recognition block, to the slower, and to the timeframe adaptation block,
- a reconstitution block that deletes the patterns to be eliminated from the digital audio signal and reconstructs the digital audio signal,
- an output that restores a slowed-down digital audio signal.

According to one aspect, the pattern database is specific to each language. This is because the expressions, such as dummy words related to language tics, cannot be transposed from one language to the other.

According to one variant, a language detector may be added to the converter, particularly in order to be able to switch from one database to another depending on the language used.

One advantage of the present invention is that it enables instant, interactive, and transparent communication between two speakers, one of whom is not fluent in the language being used.

BRIEF DESCRIPTION

Other characteristics and advantages of the present invention will become apparent upon reading the following description of one embodiment, which is naturally given by way of a non-limiting example, and in the attached drawing, in which:
FIG. 1 depicts one embodiment of the device,
FIG. 2 depicts one embodiment of the method.

The following description relates to one preferred embodiment in which the digital signal is a digital audio signal exchanged between a speaker and a listener.

DETAILED DESCRIPTION

In the embodiment of the invention depicted in FIG. 1, the device 1 comprises an input 2 that receives a digital audio signal 3 corresponding to the speaker's speech and an output 4 through which a slowed-down digital audio signal 5 is sent to the speaker, who perceives the speaker's slowed-down speech.

The input 2 is connected to a converter 6 whose function is to convert the digital audio signal 3 into a text 7 made up of a series of words in ASCII format (for "American Standard Code for Information Interchange"), for example. The obtained text 7 is transmitted to a timestamper 8 that assigns a timestamp bookmark to each word, meaning a sequence of characters representing the date and time (or "timestamp") Timestamping is a mechanism that consists of associating a date and time with computer data. It makes it possible to assess how much time has elapsed since a reference moment. Timestamp bookmarks are assigned for the start and end of each word. Each word receives timestamp bookmarks for defining the absolute time when it was spoken and the duration it takes up within the text.

A reference clock 9 provides the timestamper 8 with an absolute-time centralized reference, based on which the timestamp bookmark that serves as a basis for time comparison is set.

The timestamped words 10 in ASCII format are then transmitted to a pattern recognition block 11 associated with a pattern database 12.

The pattern database 12 is a location for the storage of referenced patterns, which are groups of words to be eliminated. Qualifiers are assigned to these patterns. Some examples of qualifiers include the number of occurrences of that word or group of words (to identify repeated words), or filler patterns, typical of the language but meaningless, which must be eliminated, including expressions like to sais, voilà, d'accord, effectivement, etc. . . . in French, or "you know", "there you go", "right", "clearly", "like", etc. . . . in English.

The pattern recognition block 11 individually receives the timestamped words 10. The pattern recognition block 11 identifies the timestamped words that belong to patterns which are referenced in the pattern database 12 and the other timestamped words 13 that are preserved. The pattern recognition block 11 assembles the identified words into groups of words based on those patterns, i.e. for example in the same order as how the words appear in the pattern. The pattern recognition block 11 particularly marks the repeated words that must be eliminated. Finally, the pattern recognition block 11 enriches the database 12 by adding to it any patterns that are not already included. Adding new patterns to be eliminated into the pattern database 12 is one essential function of the pattern recognition block 11, as the corresponding words might ultimately be preserved if they are not included in a referenced pattern. The goal is then to be able to delete all unneeded words that belonging to a referenced pattern in a single operation. Enriching the database 11 is therefore a particularly important step of the method.

Once pattern recognition has been performed, the groups of timestamped words 10 in ASCII format are sent to a pattern filtering block 14. It is a function of the pattern filtering block 14 to separate the words to be kept 13 from the patterns to be eliminated 15 found in the pattern database 12 and which were identified by the pattern recognition block 11. The output of the pattern filtering block 14 is made up both of the patterns to be eliminated 15 and of the set of timestamped groups of words 13 that will be kept and heard by the listener who is uncomfortable with the language.

The pattern database 12 can be accessed by the pattern recognition block 11 from which it receives new patterns to be eliminated, and by the pattern filtering block 14 which separates patterns to be eliminated 15 and timestamped words 13 to be kept in the text.

Naturally, the pattern database 12 is specific to the language in question, and contains patterns typical of that language. They are simple text patterns that are well-known known for each language. These patterns can be provided by linguists and stored in the pattern database 12 simply by typing the pattern in the form of ASCII text. However, the enrichment of the pattern database 12 requires precautions, as oft-repeated words or expressions may be important information, such as a company name that is frequently repeated throughout the conversation. It is possible to active the automatic enrichment of the pattern database 12 by the pattern recognition block 11 while requiring a list of words whose presence is permitted in the conversation. If so, the pattern recognition block 11 shall be capable of enriching the pattern database 12 with the help of the occurrence counter. Other forms of pattern recognition are foreseeable, and may lead to an increase in the content of the database.

One effective embodiment is to assign a priority level to each pattern: a high priority is assigned to the patterns initially present in the pattern database 12, for example added by a linguist, and a lower priority is assigned to the patterns from the pattern recognition block 11. Depending on the desired rate of slowdown for the speech, the low-priority patterns may be kept or eliminated.

The device 1 further comprises a slower 16 of the digital audio signal that receives both the digital audio signal 3 in its initial state as it enters the device 1, and instructions on the desired rate of slowing sent by a rate controller 17. The digital audio signal 3 is slowed down by using a commercially available optimized slowing algorithm. The initially received digital audio signal 3 is then converted into a slowed-down digital audio signal 18.

The rate controller 17 calculates the time to be deleted corresponding to the duration of the patterns to be deleted 15 identified by the pattern recognition block 11. The function of the rate controller 17 is to determine the rate of slowing to apply, and to adapt the rate of slowing the digital audio signal 3 to the effectiveness of the filtering performed by the pattern filtering block 14. This is because some speakers have a concise manner of speaking, which uses few repetitions or unneeded words. If so, the filtering leads to a low reduction in the rate of speaking and retains interactivity nearly in real time. The slowdown must therefore be adjusted. This is done by constantly comparing, after filtering, the timestamp bookmarks of the words to be kept 13 to the reference time given by the reference clock 9. The rate controller 17 deduces from it the positive or negative direction of the time shift, which determines the necessary rate of slowing.

The slowed-down digital audio signal 18 is sent to a reconstitution block 19 that deletes patterns to be eliminated 15 and reconstructs the text from the timestamped words 13 that are kept by the pattern filtering block 14, based on timestamp bookmarks placed at the start and end of each word. However, the timestamp bookmarks that were added by the timestamper 8 into the text 7 correspond to the actual time when the initial digital audio signal 3 was received, which is different from the time of the slowed-down digital audio signal 17.

A timeframe adaptation block 20 defines a slowed-down timeframe based on the desired rate of slowing compared to the absolute time given by the reference clock 9. A timestamp bookmark adaptation block 21 converts the timestamp bookmarks associated with each word to match the slowed-down timeframe.

The device 1 then delivers at the output 4 of the reconstitution block 19 a slowed-down digital audio signal 5 to a listener, who experiences improved conditions of understanding the speaker without the speaker being aware of it or needing to alter how quickly he or she is speaking.

Now consider FIG. 2, which depicts on example application of the implemented method thanks to the device 1 just described. A speaker 20 utters words 21, such as "Marvellous, you know". This phrase is received by the converter 6 in the form of a digital audio signal that it converts into text 22 made up of words, for example in ASCII format. Each word 23 of the text is isolated, and it is assigned a timestamp bookmark by the timestamper 8. The pattern recognition block 11 identifies the superfluous words 24 that belong to patterns referenced in the database 12, and the superfluous words 24 are then eliminated by the pattern filtering block 14.

The utterance 21 of the speaker 20 is also transmitted to the slower 16 controlled by the flow controller 17. The utterance 21 of the speaker 20 is converted into a slowed-down utterance 18. At the same time, the timestamp bookmarks are modified accordingly by the timestamp bookmark adaptation block 21 based on the slowed-down timeframe. The kept words are then reorganized by the reconstitution block 19, and a slowed-down, more concise utterance 22 is sent to the listener 23.

In the event that the speaker decides to change language during the discussion, for example by switching to a different language than his or her native language, two options are possible.

Using a foreign language most commonly leads to much lower elocution than when the speaker is using his or her native language. It therefore becomes possible to disable the slowing, based on incidents reported by the converter 6.

Alternatively, a language detector may be added to the converter 6 in order to switch the functions of the device 1 from one language to another by adapting the references, the database, and the recognition modes. However, it must be emphasized that this second option requires that several words be pronounced before the language detector can identify the language change and the language used. In this case, the incidents that occurred during speaking are not corrected, but are kept in the slowing process and transmitted to the speaker. As a result, the transition between the two languages appears completely transparent for both speakers.

This process of slowing a digital signal may be used in other applications. Thanks to timestamping, the same method that has just been described for a digital audio signal is also applicable to a digital video signal associated with a digital audio signal. The slowing of a digital video signal may cause discomfort to a viewer in the event that some image passages are eliminated due to difficulties joining the remaining images. It is more convenient to simply slow the digital audio signal alone, while ensuring that it remains in keeping with the image. However, it is entirely possible to slow both the digital audio signal and the digital video signal, although this is more complicated.

The digital audio signal is slowed down by the method previously described by means of the same device. The rate of slowing must take into account an additional parameter that is the match between the image and the utterance, such as in a dialogue for example. The slowed-down digital audio signal is then combined with an unchanged digital video signal.

Naturally, the present invention is not limited to the described and depicted embodiments, but rather is subject to many variants accessible to the person skilled in the art without departing from the spirit of the invention. In particular, without departing from the scope of the invention, it is possible to convert the digital audio signal into an ASCII, binary, phonetic, or any other format.

There is claimed:

1. A method for slowing a digital audio signal received from a transmitter in order to transmit a slowed-down digital audio signal to a receiver, comprising:
   converting the digital audio signal received from the transmitter into a text composed of a series of words,
   assigning a timestamp bookmark to each word in the text relative to an absolute time reference,
   identifying words that belong to patterns referenced in a database, which allows the patterns to be eliminated to be deduced,
   adding, from the text converted from the digital audio signal, new patterns of words to be eliminated into the database, wherein the new patterns of words to be eliminated are assigned qualifiers that include a number of occurrences of a word or a group of words,
   assigning, to the new patterns of the words to be eliminated, qualifiers that comprise a number of occurrences of a word or a group of words,
   defining a rate of slowing based on the patterns to be eliminated,
   adapting the timestamp bookmarks to a slowed-down time frame based on the rate of slowing,
   slowing down the digital audio signal,
   deleting the patterns to be eliminated from the digital audio signal based on at least the assigned qualifiers, and
   transmitting a slowed-down digital audio signal to the receiver.

2. The method according to claim 1, wherein the pattern database receives the new patterns from a pattern recognition block.

3. The method according to claim 1, wherein the pattern database receives a list of required words whose presence is permitted in the patterns that comprise the conversation.

4. The method according to claim 1, further comprising assigning a priority level to each pattern.

5. The method according to claim 1, wherein the bookmark timestamps are assigned with reference to the absolute time, then converted into a slowed-down timeframe.

6. The method according to claim 1, wherein the series of words are in American Standard Code for Information Interchange (ASCII) format.

7. A device, comprising:
   an input that receives a digital audio signal from a transmitter,
   a converter that converts the digital audio signal into a text composed of a series of words,
   a timestamper that associates timestamp bookmarks with each of the text's words,
   a pattern database that contains the referenced patterns, wherein the reference patterns comprise words to be eliminated,
   a pattern recognition block that identifies the words contained in the referenced patterns and deduces the patterns to eliminate and adds, from the text converted from the digital audio signal, new patterns of words to be eliminated into the pattern database, wherein the new patterns of words to be eliminated are assigned qualifiers that comprise a number of occurrences of a word or a group of words,
   a pattern filtering block that filters the patterns to be eliminated,
   a flow controller that defines a rate of slowing,
   a digital audio signal slower that slows the digital audio signal based on the rate of slowing,
   a reconstitution block that deletes the patterns to be eliminated from the digital audio signal based on at least the assigned qualifiers and reconstructs the digital audio signal, and
   an output that restores a slowed-down digital audio signal.

8. The device according to claim 7, wherein the pattern database is specific to each language.

9. The device according to claim 7, wherein the converter comprises a language detector.

10. The device according to claim 7, further comprising:
    a timeframe adaptation block that defines a slowed-down timeframe based on the rate of slowing,
    a timestamp bookmark adaptation block that adjusts the timestamp bookmarks within the slowed-down timeframe, and
    a reference clock that provides an absolute reference time to the pattern recognition block, to the slower, and to the timeframe adaptation block.

11. An apparatus, comprising:
    means for converting a digital audio signal received from a transmitter into a text composed of a series of words,
    means for assigning a timestamp bookmark to each word in the text relative to an absolute time reference,
    means for identifying words that belong to patterns referenced in a database, which allows the patterns to be eliminated to be deduced and adding, from the text converted from the digital audio signal, new patterns of words to be eliminated into the database, wherein the new patterns of words to be eliminated are assigned qualifiers that comprise a number of occurrences of a word or a group of words,
    means for defining a rate of slowing based on the patterns to be eliminated deduced from the database,
    means for adapting the timestamp bookmarks to a slowed-down time frame based on the rate of slowing,
    means for slowing down the digital audio signal,
    means for deleting the patterns to be eliminated from the digital audio signal based on at least the assigned qualifiers, and
    means for transmitting a slowed-down digital audio signal to a receiver.

* * * * *